(12) United States Patent
Lang et al.

(10) Patent No.: US 6,476,358 B1
(45) Date of Patent: Nov. 5, 2002

(54) HEATABLE REAR VIEW MIRROR

(75) Inventors: Heinrich Lang, Deutschland (DE); Wolfgang Seiboth, Deutschland (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/371,183

(22) Filed: Aug. 10, 1999

(30) Foreign Application Priority Data

May 18, 1999 (DE) .......................................... 199 22 778

(51) Int. Cl.$^7$ ................................................ H05B 1/00
(52) U.S. Cl. ...................................... 219/219; 219/203
(58) Field of Search ................................ 219/200, 201, 219/219, 202, 203, 220; 359/585, 586, 580

(56) References Cited

U.S. PATENT DOCUMENTS

| | | | |
|---|---|---|---|
| 2,693,589 A | * | 11/1954 | Hopkins ..................... 219/219 |
| 3,790,748 A | | 2/1974 | Van Laethem et al. |
| 3,887,788 A | | 6/1975 | Seibel et al. |
| 4,037,286 A | | 7/1977 | Medearis et al. |
| 4,071,736 A | | 1/1978 | Kamerling |
| 4,241,290 A | | 12/1980 | Folland |
| 4,352,006 A | | 9/1982 | Zega |
| RE31,367 E | | 8/1983 | D'Entremont |
| 4,588,267 A | | 5/1986 | Pastore |
| 4,628,187 A | | 12/1986 | Sekiguchi et al. |
| 4,630,904 A | | 12/1986 | Pastore |
| 4,631,391 A | | 12/1986 | Tiepke |
| 4,823,104 A | | 4/1989 | Ekowicki et al. |
| 4,849,729 A | | 7/1989 | Hofsass |
| 4,857,711 A | | 8/1989 | Watts |
| 4,878,038 A | | 10/1989 | Tsai |
| 4,882,565 A | | 11/1989 | Gallmeyer |
| 4,929,074 A | | 5/1990 | Urban |
| 4,931,627 A | | 6/1990 | Watts |
| 4,940,317 A | | 7/1990 | Reuben |
| 4,942,286 A | | 7/1990 | Monter et al. |
| 4,993,945 A | * | 2/1991 | Kimmelman et al. ....... 219/219 |
| 5,015,824 A | | 5/1991 | Monter et al. |
| 5,079,406 A | * | 1/1992 | Nagy ......................... 219/219 |
| 5,130,842 A | | 7/1992 | Gauthier et al. |

(List continued on next page.)

FOREIGN PATENT DOCUMENTS

| | | |
|---|---|---|
| DE | 19643835 A1 | 5/1998 |
| DE | 19704352 | 6/1998 |
| JP | 03065457 | 3/1991 |
| JP | 08150905 | 6/1996 |

OTHER PUBLICATIONS

Translation of German Patent No. DE 196 43 835 A1.
European Search Report, dated Feb. 12, 2002.
Translation of European Search Report.
Abstract for Japanese Publication No. 03065457, Publication Date Mar. 20, 1991.
Abstract for Japanese Publication No. 08150905, Publication Date Jun. 11, 1996.
Abstract for German Patent No. 197 04 352.

*Primary Examiner*—Tu Ba Hoang
(74) *Attorney, Agent, or Firm*—Dority & Manning, P.A.

(57) ABSTRACT

A heatable rear view mirror assembly providing a visible indication to a driver of heating function is disclosed. The assembly includes a mirror housing, at least one mirror pane disposed within the mirror housing, at least one heating element disposed within the mirror housing for heating the mirror pane, a thermostat disposed within the mirror housing for automatically activating the heating element, and a display element secured to the mirror housing and visible to the driver, the display element being activated by the thermostat upon activation of the heating element. A related mirror assembly is also disclosed.

9 Claims, 2 Drawing Sheets

U.S. PATENT DOCUMENTS

| | | |
|---|---|---|
| 5,151,824 A | 9/1992 | O'Farrell |
| 5,204,509 A | 4/1993 | Etters et al. |
| 5,206,482 A | 4/1993 | Smuckler |
| 5,207,492 A | 5/1993 | Roberts |
| 5,229,582 A | 7/1993 | Graham |
| 5,285,060 A | 2/1994 | Larson et al. |
| 5,446,576 A | 8/1995 | Lynam et al. |
| 5,576,885 A | 11/1996 | Lowe et al. |
| 5,631,638 A | 5/1997 | Kaspar et al. |
| 5,716,536 A | 2/1998 | Yokoto et al. |
| 5,721,646 A | 2/1998 | Catlin et al. |
| 5,786,772 A | 7/1998 | Schofield et al. |
| 5,904,874 A | 5/1999 | Winter |
| 5,925,272 A | 7/1999 | Lang et al. |
| 5,938,957 A | 8/1999 | Tanahashi et al. |
| 5,990,449 A | 11/1999 | Sugiyama et al. |

\* cited by examiner

HEATABLE REAR VIEW MIRROR

BACKGROUND OF THE INVENTION

The present invention concerns a heatable rear view mirror. It is in common knowledge to construct rear view mirrors for motor vehicles and especially in the present case, outside rear view mirrors, in such a manner that they may be heated. In this way, condensate, frost, snow ice or the like are removed from the mirror surface by means of a heating element in order that the mirror may provide an unobstructed field of view to the rear. The heating elements are designed, in this case, in the form of surface heating elements, which cover, essentially, the total, full surface of the mirror pane and extend themselves to the back side. Further, it is known, in the case of heatable rear view mirrors, to activate the heating element by means of a thermostat, that is, quasi-automatically, wherein, at a specified outside temperature, the thermo-switch closes the energized circuit to the heating element, so that it becomes activated.

Since the on and off switching of the mirror heating or of the heating element by means of the thermostat is done automatically, the driver of one of these vehicles equipped with one or more such mirrors has difficulties in recognizing whether the heating of the mirror is already automatically switched on or not. Often the mirror pane, for instance, is "blind" because of fogging or the like, yet the thermostat has still not switched itself on, since the temperature is not yet low enough, or the thermostat has directly switched to the on position before the driver checks the mirror viewing conditions. However, in the latter situation during the short time since the moment of switching on, no result is noticeable, since the mirror pane is not yet sufficiently warm. In such cases, the mirror heating is often turned on by the driver manually, but this additional manipulation by the driver is often unnecessary. If the thermostat has energized only immediately before the driver check of the mirror viewing conditions, and yet no evidence was seen thereof, then the mirror pane may not yet be sufficiently warmed. In other words, it would be desirable for the driver of a motor vehicle, which is equipped with one or more heatable rear view mirrors, to always know whether in the case of a fogged or "blind" mirror, that the automatic heating for the mirror for the elimination of this fogging is already turned on or not. If not, then in case of need, it would be possible to turn on the heater element by a separate switch which parallels the thermostat.

OBJECTIVES AND SUMMARY OF THE INVENTION

From these considerations, the present invention assumes the purpose to create a possible method for notifying the driver that the automatic mirror heating has been put into operation by the thermostat, whereby, this notification is carried out, so that the driver is not diverted from attention to street traffic.

For the achievement of this purpose, the present invention proposes a heatable rear view mirror, especially for motor vehicles, with at least one mirror pane contained in a mirror housing and at least one heating element dedicated to that mirror pane. The heating element is in the form of a surface heating element, which is actuated by means of a thermostat. This commonly known, heatable rear view mirror is, in accord with the invention, improved in such a manner that, in the case of an activated heating element, at least one display element is also activated, which is visible in a direct front view of the mirror.

With one glance at the rear view mirror, which practically every driver of the motor vehicle makes before, or immediately after starting a trip, in order to check the condition and adjustment of the mirror, the driver can thus verify whether or not the automatic mirror heating or heater equipment is switched on or off. If the visible display element seen in the direct front view of the mirror is activated, the display means that the thermostat has switched on the heating element and the mirror is already heated. In the case of a mirror which is still fogged or "blind", the display indicates to the driver that he need not, on his own, activate the mirror heating from the instrument board, but that the mirror heating is already active, and within a short time, an unobstructed field of vision will appear through the then clear mirror. On the other hand, if the driver recognizes that the mirror is fogged, or is otherwise "blind", and the mirror heating is still not activated, (since the display element is likewise not activated), he can directly activate the mirror heating by means of a corresponding manual switch operation.

Since the display element is visible in direct front view of the mirror the driver is not required to monitor any pilot light or the like on the instrument board. With a short side glance, without even moving his head, he can verify not only the condition of the mirror (adjustment and image quality) but also the on or off situation of the mirror heating. Distraction from attention to traffic is thus minimized.

Preferably, the display element emits light in the visible range, whereby the display element is designed as a light emitting diode (LED). LEDs are available in various colors, withstand on/off procedures in the area of several hundred thousand switching cycles, are insensitive to vibration, require no high connection costs and are easy to install.

In this case, the display element can be placed, for instance, behind the mirror pane and emit through the mirror pane. The display element or the LED lies thus behind the mirror pane and emits through the reflective coating directly in an outward direction. Because of the light penetration through the reflective coating from behind, there arises a certain weakening of the light emanating from the mirror surface. On this account, it is preferred, at the point where the display element will be placed, to remove, at least partially, the reflective layer in dashed lines or punctuations in order to achieve a greater emission of light. Also at this location of the display element, if the heating element is designed as a surface heater, an area must be cut out in the form of a round or rectangular shape. An advantage of the placement of the display element behind the mirror pane is that the display element is encapsulated on all sides by the mirror housing and mirror pane, and thereby protected. Furthermore, the display element lies directly in the sighting field of the driver.

As an alternative to the placement behind the mirror pane the display element can also be located beside the mirror pane in a designed rim area located between the mirror pane and the mirror housing. This placement has the special advantage that, in the case of a massively encrusted mirror pane (thick frost), the display element is more visible, than when it is behind the mirror pane and covered by the massive encrustation.

In a preferred arrangement, the display element and the thermostat are combined into one component and can thus be mounted quickly as one unit, wherein especially wiring costs are reduced.

Just as well, the display element and the thermostat can serve as separate items and then be brought together in a subassembly. This combination process is particularly advantageous in that it is made by a plug-in arrangement.

The brightness of the display element can be advantageously adjustable, in order to make sure that the display is sufficiently bright in a bright surrounding, such as during the day. In a darker situation, that is at night, it must not be so bright that it negatively affects the driver's vision.

In this matter, the brightness can be automatically controlled dependent upon the intensity of the ambient light and, for instance, the monitor could be a photocell.

The display element, in accord with the basic idea or embodiment of the present invention, can be the display, per se, for the mirror heating. Just as well, however, the display element can illuminate from behind a corresponding symbol which then makes explicitly clear, unmistakably to the driver, that the mirror heating is activated. This symbol can be, for instance, adhesively fastened to the outside mirror surface or it can be engraved in the outside mirror surface or etched therein.

Further details, aspects, and advantages of the present invention arise from the following to be understood as a purely illustrative and non-limiting description of an embodiment in the drawing.

BRIEF DESCRIPTION OF THE DRAWINGS

There is shown in.

DESCRIPTION OF THE PREFERRED EMBODIMENT

Figure 1:
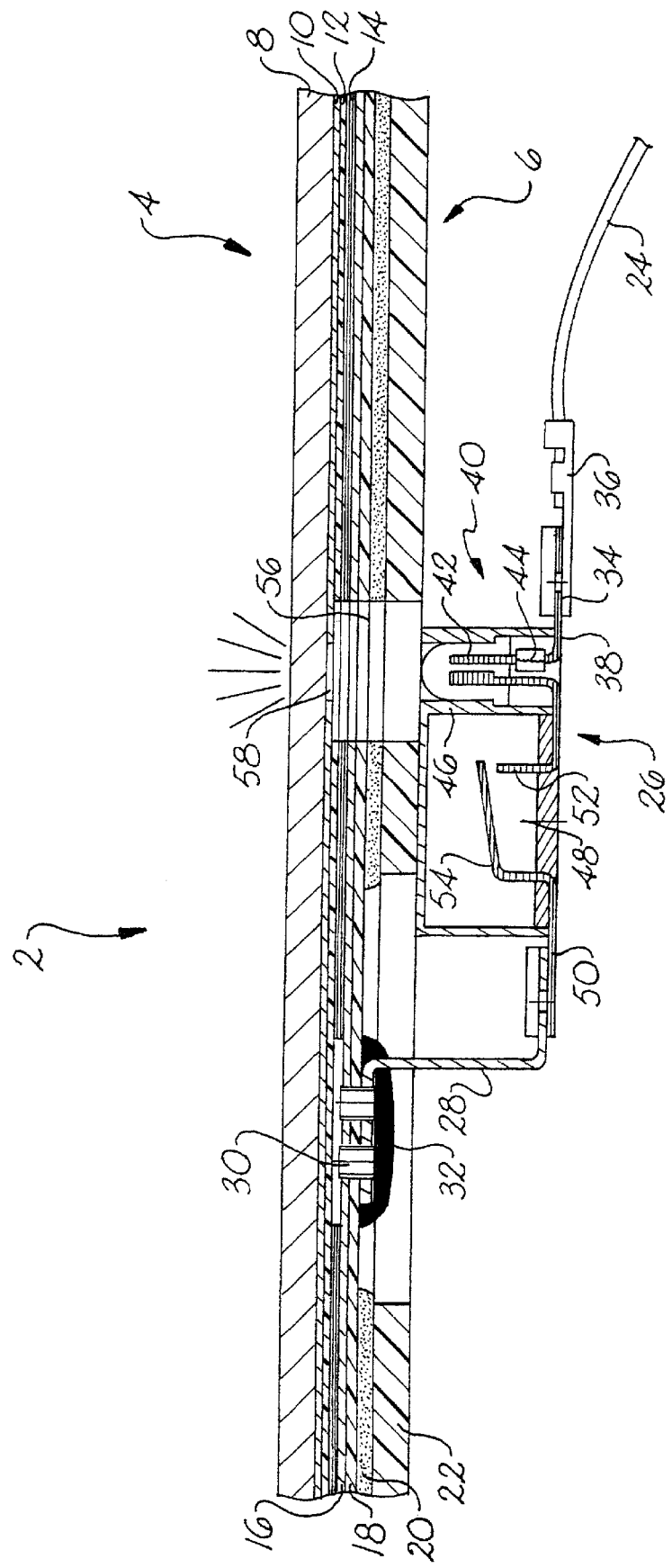
FIG. 1 a partial sectional view through a heatable rear view mirror in accord with the invention.

Reference will now be made in detail to the presently preferred embodiments of the present invention, one or more examples of which are illustrated in the drawings. Each example is provided by way of explanation of the invention, and not meant as a limitation of the invention.

A rear view mirror as shown in FIG. 1, under the general designation of 2, exhibits a multilayered construction from a mirror outer, or forward, side 4 to a mirror inside, or rear, side 6. The layers are namely, a mirror pane 8, a reflective surface 10, a doubled sided adherent film 12, a semiconductor paste 14, a silver conducting paste 16, a polyester film 18, an adhesive 20 and a pane support 22. Mirror 2 is mounted in a housing 1.

The construction of the rear view mirror with the layers 8 through 22 forms in a conventional manner a heatable rear view mirror with a surface type heating element, which is essentially constructed by the semiconductor paste 14 and the silver conducting paste 16.

The electrical connection necessary for the achievement of electrical current flow and thus also of heat generation is accomplished by cable 24, connected to subassembly 26, which group will be described below. From the subassembly 26, a solid connection 28 is run to the heat element, which element is essentially comprised of the semiconductor paste 14 and the silver conductive paste 16. The contacting of the connection 28 with the heating element is accomplished, for example, by one or more rivets 30, wherein the connection zone is embedded in an insulating material 32. A second such connection is provided to create a closed circuit in connection with the heating element, but is not shown in FIG. 1.

The subassembly 26 exhibits on one end or on a side a contacting plug 34 which is insertable into a receptacle 36 on the cable 24. From the contact plug 34 (a connection 38) runs to a display element 40, which, in the depicted embodiment, is a light emitting diode (LED) 42 with an integral series resistor 44. The LED 42 is secured in a holder 46, which is fastened to the underside of the support plate 22. The fastening is effected by adhesion or in that the holder is made in one piece with the support plate 22. Further, this holder 46 also carries a thermostat 48. A connection 50 leading away from the thermostat 48 connects to the connector 28, which then leads to the heating element.

The thermostat 48 possesses a solid contact 52 and a movable contact 54, which is, for example, comprised of bimetallic strips and is dependent upon the ambient temperature as to whether movable contact 54 makes with the solid contact 52, thus closing the circuit, or whether contact 54 breaks from the solid contact 52, thereby opening the circuit as shown in FIG. 1. In the case of a closed circuit, the heating element is activated, and conversely, upon a broken circuit, the same is deactivated.

At that point where the display element 40, i.e. the LED 42, is situated, the individual layers 10 to 22 are, for example, circularly excised and form thereby an open cutout 56. Furthermore, the reflective layer 10 is similarly circularly excised, again forming therein an open cutout, which now represents an aperture 58. In accord with FIG. 1, aperture 58 lies coaxially to the circular cutout 56, (and can be) of a smaller diameter or of the same size as the cutout 56. Thus, emitted or radiated light from the LED 42 can emerge through the cutout 56 and the aperture 58 and through the mirror pane 8 to the outside.

Instead of the aperture 58, in its place can be a symbol or pictogram, which is then illuminated by the LED from behind, and is visible on the outside 4 of the rear view mirror 2. A symbol of this kind or a pictogram can also be glued to the outer surface of the mirror, or inscribed or etched therein, so that, in similar manner, it is illuminated by the LED 42 from behind.

Figure 2:
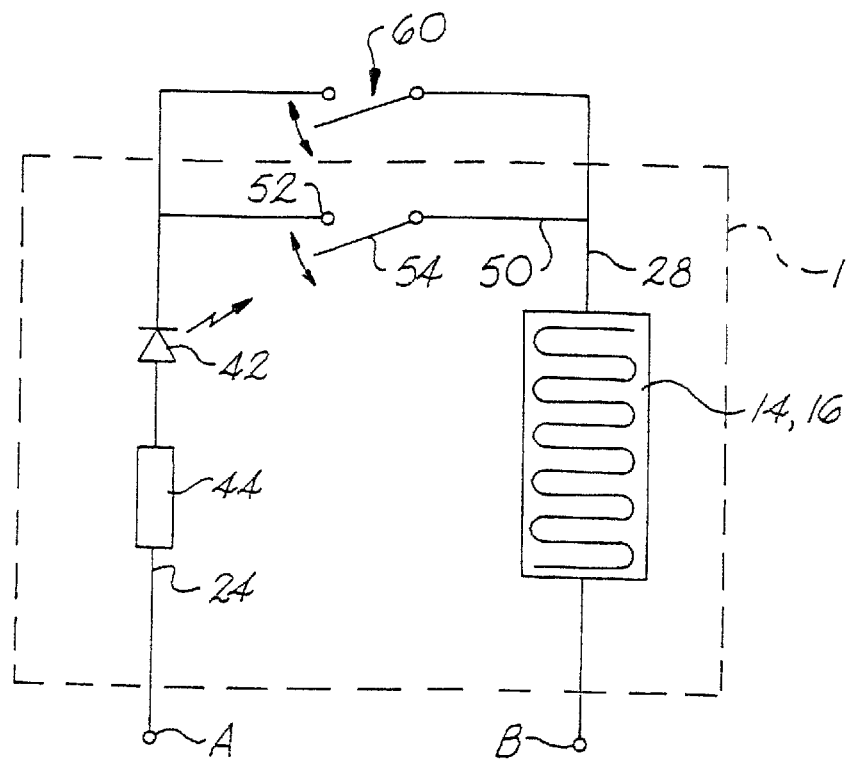
FIG. 2 a schematic circuit diagram of the electrical components of the heatable rear view mirror of FIG. 1.

The electrical circuit diagram of the assembly as shown in FIG. 1, is once again repeated in FIG. 2. The current circuit runs from a line connection A, through the cable 24, through the series resistor 44, the LED 42, the solid and the movable contacts 52, 54 of the thermostat 48, as well as through the connections 50 and 28 to the heating element. The heating element is comprised of the semiconductor paste 14 and the silver conducting paste 16. From the heating element, the current circuit runs to a line connection B, not further described in FIG. 1. The line connections A and B are connected to the on-board electrical system of the motor vehicle. In addition to the thermostat 48, yet another switch 60 is provided, with which the thermostat 48 can be bypassed. In other words, even with an opened thermostat 48 switch, by means of the switch 60, the circuit between the connections A and B, through the LED 42 and the heating element can be closed. The additional switch 60 is to be located on the instrument panel of the motor vehicle and at that position can be manually operated by the driver.

Further, an apparatus can even be provided which can adjust the intensity of the light emitted by the LED 42 or from another display element. The operation thereof would preferably be carried out automatically. This process would be done by an appropriate sensor, for instance, a photocell or the like, which would regulate the intensity of the light from the LED 42, that is, the display element 40, in accord with the intensity of the ambient light. The brighter the ambient light is, just so much brighter the display element would be regulated. Conversely, the darker the surrounding light is, just so weaker would be the light emission of the display element 40. Sufficient visibility on the one hand, yet an avoidance of a detrimental visual stimulus on the other is hereby assured.

For instance, the subassembly 26 can be designed as a factory assembled unit and mounted on a circuit board, which, by means of the support 46, can be fastened onto the rear side of the support plate 22. As an alternative to this, the single components of the subassembly 26, including the series resistor, the display device 42 and the thermostat 48 can all be individual components. They can be put together to make up the subassembly in a plug-in connection with one another.

The movable contact 54 of the thermostat 48 closes the current circuit at a specified ambient temperature, so that the mirror heating is turned on by itself. The mirror pane 8 is essentially completely heated over the entire surface from behind, so that a fogging, frost, or the like is removed from the mirror pane surface by the heating of the mirror pane 8. At the same time this is going on, the activated display element or LED 42 is visible through the cutout 56 and the aperture 58. In one glance in the rear view mirror the driver of a motor vehicle recognizes, whether or not this heating has been switched on automatically. If, for any reason, the mirror pane 8 is fogged, covered with frost, or is otherwise "blind", and the LED 42 does not light up, that is, the thermostat has not closed the current circuit automatically, then the driver can bypass the thermostat manually by closing the switch 60 and thus energize the mirror heating, in order to have an unobstructed view.

If, in the aperture 58 or, the cutout 56, a symbol or a pictogram is arranged on the outside of the mirror, for instance, a plurality of interposed wave lines, then the driver can unmistakably be advised by the display that the mirror heating is in operation.

Figures 3A, 3B:
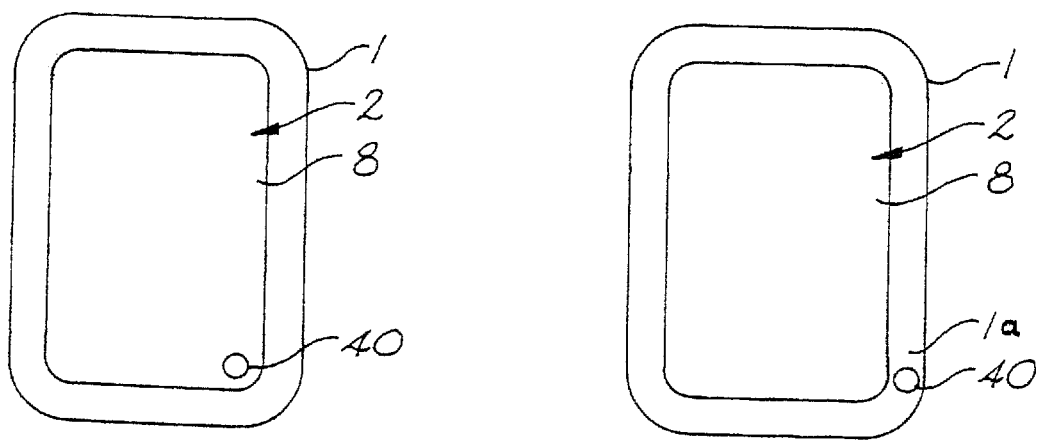
FIG. 3a is a schematic diagram of a first location of a display element.
FIG. 3b is a schematic diagram of a second location of a display element.

Instead of locating the subassembly 26 containing the LED 42 or another light emitting optical display element in the preferred mirror viewing area as in FIG. 3a, at least the display element 40, for instance, in the form of an LED, can be located beside the mirror pane as in FIG. 3b. This location would be in a designed rim area, located between the mirror pane 8 and the mirror housing 1a. In this way, the display element 40 or the LED 42 is still in the direct viewing area of the driver, but no longer situated behind the mirror pane 8. Under some circumstances this has the advantage, that in the case of a particularly heavily fogged mirror or a mirror surface covered with a thick layer of frost, the LED 42 situated outside of the surface of the mirror pane 8 would be more visible.

By means of a preferred embodiment of the present invention, it is possible to make the automatic on and off switching of a heating element for a heatable rear view mirror visible to the driver, without the necessity of the driver to look outside of his normal field of vision or to monitor a display element for the thermostat on his instrument panel. In case of need a non-activated mirror heating element can be turned on by an additional manual switch, in order to continually have a clear mirror surface and an unobstructed field of vision.

It will be apparent to those skilled in the art that various modifications and variations can be made without departing from the scope and spirit of the invention, as embodied in the appended claims and their equivalents.

What is claimed is:

1. A heatable rear view mirror assembly providing a visible indication to a driver of heating function, the assembly comprising:

a mirror housing;

at least one mirror pane disposed within the mirror housing;

at least one heating element disposed within the mirror housing for heating the mirror pane;

a thermostat disposed within the mirror housing for automatically activating the heating element; and a display element secure to the mirror housing and visible to the driver, the display element being activated by the thermostat upon activation of the heating element.

2. A mirror as in claim 1, wherein the display element emits light in the visible range.

3. A mirror as in claim 1, wherein the display element is a light emitting diode.

4. A mirror as in claim 1, wherein the display element is positioned behind the mirror pane and is visible through the mirror pane.

5. A mirror as in claim 1, wherein the display element is disposed beside the mirror pane within the mirror housing.

6. A mirror as in claim 1, wherein the display element and the thermostat form a subassembly separably securable to the mirror pane.

7. A mirror as in claim 1, wherein the intensity of light emitted by the display element is adjustable.

8. A heatable rear view mirror assembly comprising:

at least one mirror pane;

at least one heating element secured to the mirror pane for heating the mirror pane; and a display subassembly securable to the mirror pane and including a thermostat for automatically activating the heating element, and a display element activated by the thermostat upon activation of the heating element.

9. A mirror assembly as in claim 8, wherein the thermostat and display element are connected in series electrically.

* * * * *